(12) United States Patent
Kuo et al.

(10) Patent No.: US 10,699,029 B2
(45) Date of Patent: Jun. 30, 2020

(54) DATA DE-IDENTIFICATION METHOD, DATA DE-IDENTIFICATION APPARATUS AND NON-TRANSITORY COMPUTER READABLE STORAGE MEDIUM EXECUTING THE SAME

(71) Applicant: INDUSTRIAL TECHNOLOGY RESEARCH INSTITUTE, Hsinchu (TW)

(72) Inventors: Chuan-Wei Kuo, Taoyuan (TW); Ming-Chih Kao, Taipei (TW); Yu-Hsuan Pan, Taipei (TW); Pang-Chieh Wang, Taipei (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 289 days.

(21) Appl. No.: 15/855,786

(22) Filed: Dec. 27, 2017

(65) Prior Publication Data

US 2019/0114447 A1   Apr. 18, 2019

(30) Foreign Application Priority Data

Oct. 18, 2017 (TW) .............................. 106135782 A

(51) Int. Cl.
*H04L 29/06* (2006.01)
*G06F 21/00* (2013.01)
*G06F 21/62* (2013.01)

(52) U.S. Cl.
CPC ................. *G06F 21/6254* (2013.01)

(58) Field of Classification Search
CPC .................................................. G06F 21/6254
See application file for complete search history.

(56) References Cited

U.S. PATENT DOCUMENTS 9,230,132 B2   1/2016 Gkoulalas-Divanis et al.
2011/0289590 A1   11/2011 Miettinen
(Continued)

FOREIGN PATENT DOCUMENTS

CN   101964034 A   2/2011
TW   201426578 A   7/2014
(Continued)

OTHER PUBLICATIONS

Kessler et al., "Pattern-sensitive Time-series Anonymization and its Application to Energy-Consumption Data," Open Journal of Information Systems (OJIS), vol. 1, Issue 1, 2014, pes. 3-22).

(Continued)

*Primary Examiner* — Lisa C Lewis
(74) *Attorney, Agent, or Firm* — Muncy, Geissler, Olds & Lowe, P.C.

(57) ABSTRACT

A data de-identification method, a data de-identification apparatus and a non-transitory computer readable storage medium executing the same are provided. Original data including an identification field, a condition field, and a record field is obtained. An event condition is obtained according to the condition field. From the original data, a plurality of event fragment sequences corresponding to each of a plurality of identification data and corresponding to the event condition are obtained according to the plurality of identification data in the identification field and the event condition. Sequence data is obtained according to the plurality of identification data and the plurality of event fragment sequences corresponding to each of the identification data. De-identification data is obtained by adjusting the sequence data.

17 Claims, 2 Drawing Sheets

(56) References Cited

U.S. PATENT DOCUMENTS

| | | | |
|---|---|---|---|
| 2012/0047184 A1* | 2/2012 | Purdy | H04W 4/029 |
| | | | 707/803 |
| 2013/0291128 A1 | 10/2013 | Ito et al. | |
| 2014/0189858 A1 | 7/2014 | Chen et al. | |
| 2014/0317756 A1 | 10/2014 | Takahashi | |
| 2015/0169895 A1* | 6/2015 | Gkoulalas-Divanis | ...................... |
| | | | G06F 21/6227 |
| | | | 726/26 |
| 2015/0310466 A1* | 10/2015 | LaCivita | G06Q 30/0205 |
| | | | 705/7.34 |
| 2016/0224804 A1* | 8/2016 | Carasso | G06F 16/2322 |
| 2016/0350557 A1* | 12/2016 | Mikami | G06F 16/2282 |

FOREIGN PATENT DOCUMENTS

| | | |
|---|---|---|
| TW | 201447803 A | 12/2014 |
| TW | 201710980 A | 3/2017 |
| TW | 201714113 A | 4/2017 |

OTHER PUBLICATIONS

Pensa et al., Pattern-Preserving κ-Anonymization of Sequences and its Application to Mobility Data Mining, 2008, pp. 44-60.

\* cited by examiner

DATA DE-IDENTIFICATION METHOD, DATA DE-IDENTIFICATION APPARATUS AND NON-TRANSITORY COMPUTER READABLE STORAGE MEDIUM EXECUTING THE SAME

CROSS-REFERENCE TO RELATED ART

This application claims the benefit of Taiwan application Serial No. 106135782, filed Oct. 18, 2017, the subject matter of which is incorporated herein by reference.

TECHNICAL FIELD

The application relates in general to a data de-identification method, a data de-identification apparatus and a non-transitory computer readable storage medium executing the same.

BACKGROUND

In recent years, data application has become an unmistakable trend. For business and government, how to find value, solve problems, improve work process and revitalize administrative services through data use has become one of the goals of effective use of data application.

However, the popularity of big data and open data may infringe people's privacy. Therefore, in data release, data de-identification should be considered, such that personal identity will not be directly or indirectly identified from de-identified data.

Therefore, how to remove direct or indirect identification of personal data from released data has become a prominent task for the industries.

SUMMARY

The application is directed to a data de-identification method, a data de-identification apparatus and a non-transitory computer readable storage medium executing the same.

According to one embodiment of the application, a data de-identification method is provided. Original data including an identification field, a condition field, and a record field is obtained. An event condition is obtained according to the condition field. From the original data, a plurality of event fragment sequences corresponding to each of a plurality of identification data and corresponding to the event condition are obtained according to the plurality of identification data in the identification field and the event condition. Sequence data is obtained according to the plurality of identification data and the plurality of event fragment sequences corresponding to each of the identification data. De-identification data is obtained by adjusting the sequence data.

According to another embodiment of the application, a data de-identification apparatus is provided. The data de-identification apparatus includes a processor and a memory. The memory is coupled to the processor. The processor is configured for: obtaining original data comprising an identification field, a condition field and a record field; obtaining an event condition according to the condition field; obtaining from the original data a plurality of event fragment sequences corresponding to each of a plurality of identification data and corresponding to the event condition according to the plurality of identification data in the identification field and the event condition; obtaining sequence data according to the plurality of identification data and the plurality of event fragment sequences corresponding to each of the identification data; and obtaining de-identification data by adjusting the sequence data.

According to an alternate embodiment of the application, a non-transitory computer readable storage medium storing one or more than one software program including a plurality of instructions is provided. When the plurality of instructions are executed by one or more than one processor of an electronic apparatus, the electronic apparatus performs a data de-identification method including: obtaining original data comprising an identification field, a condition field and a record field; obtaining an event condition according to the condition field; obtaining from the original data a plurality of event fragment sequences corresponding to each of a plurality of identification data and corresponding to the event condition according to the plurality of identification data in the identification field and the event condition; obtaining sequence data according to the plurality of identification data and the plurality of event fragment sequences corresponding to each of the identification data; and obtaining de-identification data by adjusting the sequence data.

The above and other contents of the application will become better understood with regard to the following detailed description of the preferred but non-limiting embodiment(s). The following description is made with reference to the accompanying drawings.

DETAILED DESCRIPTION OF THE EMBODIMENTS

A number of embodiments disclosed below for detailed descriptions of the application. However, descriptions of the embodiments are for exemplification purpose only, not for limiting the scope of protection of the present application. Furthermore, some elements are omitted in the accompanying drawings of the embodiments to clearly illustrate technical features of the application. Designations common to the accompanying drawings are used to indicate identical or similar elements.

Along with the rapid development of the Internet, data sharing is more easy and quick. However, data sharing involves personal privacy. Malicious hackers may obtain the situations of users' real lives by analyzing data, and such infringement of privacy may cause harm to the users.

The k-anonymity technology is a mechanism for protecting data privacy. Before data release, data are de-identified using the k-anonymity technology, such that at least k-1 items of data cannot be differentiated with the selected data, and hackers cannot identify a specific individual from de-identified data. The larger the k value, the better the protection of data. "De-identification" refers to data processing for removing direct or indirect identification from personal data, such that hackers cannot identify a specific individual from person data.

After data process, for a combination having multiple attribute values (such as address, age, gender), if k items of data having the same combination are found in a data set, then it is determined that the data set matches k-anonymity, wherein k is a k-anonymity parameter larger than 1 and indicates the security strength of privacy. The existing k-anonymity technology may be suffered from data loss and is not suitable for processing continuous data, such as time-series data. By combining time field in data, data including time parameter may be integrated into time-series data from which occurrence frequency may be identified, and thus there may be some risk in data re-identification. In future, data in Internet trading and Internet of Things (IoT) will be time-series data, which need to be effectively de-identified.

Figure 1:
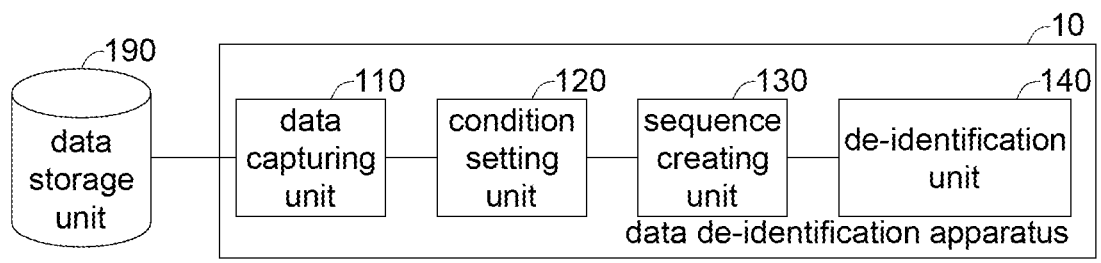
FIG. 1 is a schematic diagram of a data de-identification apparatus according to an embodiment of the application.

Referring to FIG. 1, a schematic diagram of a data de-identification apparatus 10 coupled to a data storage unit 190 according to an embodiment of the application is shown. The data de-identification apparatus 10 includes a data capturing unit 110, a condition setting unit 120, a sequence creating unit 130 and a de-identification unit 140. The data capturing unit 110 is coupled to the data storage unit 190 and the condition setting unit 120. The sequence creating unit 130 is coupled to the condition setting unit 120 and the de-identification unit 140. The data de-identification apparatus 10 may be realized by a computation apparatus including a processor and a memory coupled to the processor. For example, the computation apparatus may be realized by a PC or a server. The data storage unit 190 is used for storing original data and may be realized by a hard disk, a flash memory, a read-only memory (ROM), a non-volatile memory, a cloud storage apparatus, or a local or remote database system such as a computer system or a server. The data capturing unit 110, the condition setting unit 120, the sequence creating unit 130 and the de-identification unit 140 may be realized by such as a chip, a circuit of the chip, firmware, a circuit board having electronic elements and wires, or a non-transitory storage medium storing a plurality of programming codes of a plurality of software programs. The data capturing unit 110, the condition setting unit 120, the sequence creating unit 130 and the de-identification unit 140 may also be realized by a processor executing programming codes stored in the memory or realized by an electronic apparatus executing corresponding software or programs, wherein the electronic apparatus has one or more than one processor, such as a server, a computer system or a similar apparatus.

Figure 2:
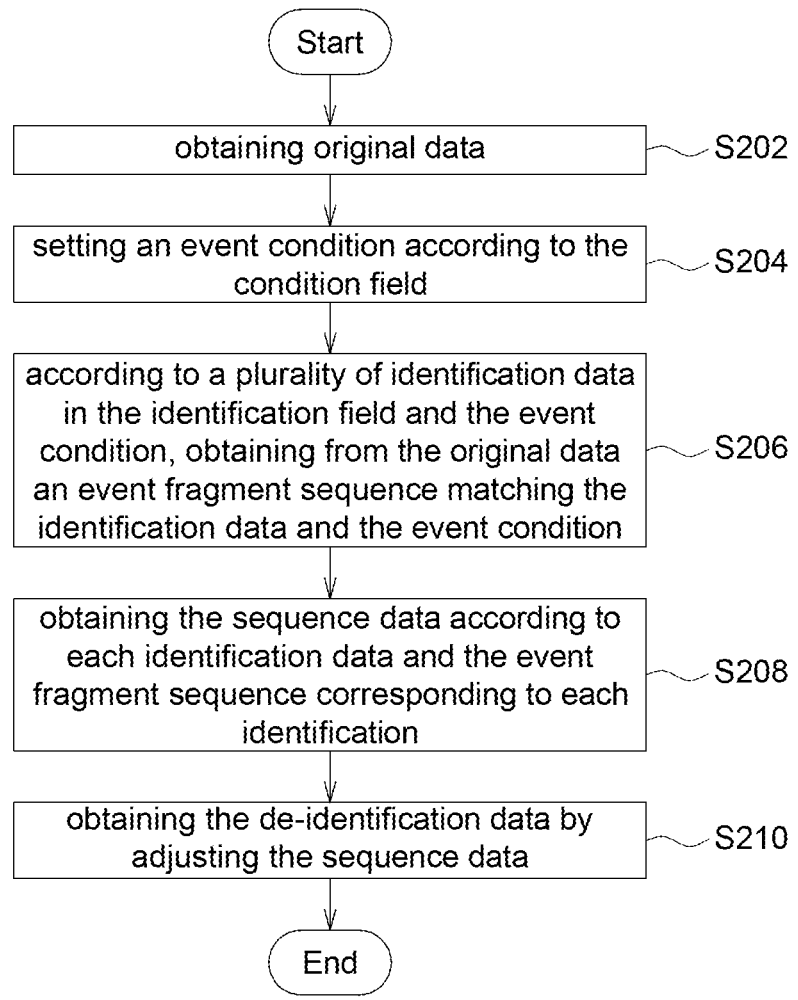
FIG. 2 is a flowchart of a data de-identification method according to an embodiment of the application.

Referring to FIG. 2, a flowchart of a data de-identification method according to an embodiment of the application is shown. The flowchart of the data de-identification method of FIG. 2 may be used in the data de-identification apparatus 10 of FIG. 1. Details of operations of the data de-identification apparatus 10 and the data de-identification method according to an embodiment of the application are disclosed below. However, anyone who is skilled in the technology field of the application will understand that the application is not limited by the data de-identification apparatus 10 of FIG. 1 or the flowchart of FIG. 2. The data de-identification method may be executed by one or more than one software program, which may be stored in an optical disk, a hard disk or a non-transitory computer readable storage medium. The software program may include instructions or software programs which is executable by a processor. The instructions or software programs may be loaded to an electronic apparatus having one or more than one processors and/or controllers for executing the data de-identification method. Detailed descriptions of the data de-identification method are disclosed below.

Refer to FIG. 1 and FIG. 2. In an embodiment of the application, the scenario is exemplified by supermarket shopping. Transaction records of the supermarket within a time period (such as a half business day, one business day, five business days or 30 business days) are listed in Table 1. The transaction records may be stored in the data storage unit 190.

TABLE 1

| Client Identi-fication | Checkout Time (yyyy/mm/dd hh/mm) | Commodity | Quantity | Unit Price (dollar) |
|---|---|---|---|---|
| ... | ... | ... | ... | ... |
| 17850 | 2017/05/29 11:00 | Milk | 3 | 90 |
| 13777 | 2017/06/03 16:26 | Tissue | 6 | 40 |
| 14729 | 2017/06/03 16:46 | Sunflower Oil | 6 | 120 |
| 17850 | 2017/06/05 18:26 | Tissue | 6 | 40 |
| 16552 | 2017/06/10 16:00 | Flour | 2 | 25 |
| 17850 | 2017/06/12 09:06 | Flour | 2 | 25 |
| 15862 | 2017/06/12 13:26 | Flour | 2 | 25 |
| 16931 | 2017/06/13 17:26 | Flour | 2 | 25 |
| 13777 | 2017/06/14 11:06 | Flour | 2 | 25 |
| 16931 | 2017/06/14 11:36 | Tooth Brush | 5 | 20 |
| 15862 | 2017/06/14 19:08 | Tooth Brush | 5 | 20 |
| 13777 | 2017/06/17 14:02 | Sunflower Oil | 6 | 120 |
| 14729 | 2017/06/17 14:25 | Towel | 12 | 10 |
| 17850 | 2017/06/17 20:02 | Sunflower Oil | 6 | 120 |
| 16552 | 2017/06/24 10:52 | Tooth Brush | 5 | 20 |
| 14729 | 2017/06/27 15:17 | Milk | 3 | 90 |
| 16931 | 2017/06/27 15:32 | Cheese | 1 | 55 |
| 17850 | 2017/06/28 15:41 | Towel | 12 | 10 |
| 13777 | 2017/06/30 10:41 | Towel | 12 | 10 |
| 16552 | 2017/07/01 16:03 | Milk | 3 | 90 |
| 13777 | 2017/07/06 17:55 | Flour | 2 | 25 |
| 15862 | 2017/07/11 10:23 | Flour | 2 | 25 |
| ... | ... | ... | ... | ... |

Firstly, the method begins at step S202 in which the data capturing unit 110 obtains original data stored in the data storage unit 190. The original data includes an identification field, a condition field, and at least one record field. The identification field records a plurality of identification data. The condition field may be such as a time field in which a plurality of time data corresponding to the identification data are recorded. The record field records another data corresponding to the identification data. In the present embodiment, the original data may be such as the supermarket transaction records of Table 1. Let the supermarket transaction records of Table 1 be taken for example. From left to right, the 1st field is the identification field which records client identification. The 2nd field is the condition field which is a time field recording the checkout time. The 3rd, the 4th, and the 5th fields respectively record the name, the quantity and the unit price of each commodity purchased by the clients.

Then, the method proceeds to step S204 in which the condition setting unit 120 obtains an event condition according to the condition field. Let the supermarket transaction records of Table 1 be taken for example. The condition setting unit 120 obtains a time interval according to the checkout time recorded in the 2nd field and further uses the time interval from 2017/06/01 to 2017/06/30 as an event condition. In the present example, the event condition is a time condition.

Then, the method proceeds to step S206 in which according to identification data recorded in the identification field and the event condition, the sequence creating unit 130 obtains from the original data an event fragment sequence matching the identification data and the event condition. In an embodiment, the sequence creating unit 130 obtains from data in the condition field the record data matching each identification data and the event condition. Then, the sequence creating unit 130 obtains at least one event fragment corresponding to each identification data according to the record data corresponding to each identification data. The event fragment includes data in the record field of the original data. Afterwards, the sequence creating unit 130 obtains the event fragment sequence corresponding to each identification (ID) according to at least one event fragment corresponding to each identification data. The event fragment may be any combination of data recorded in one or more than one record field of the original data. The event fragments of the event fragment sequence are sorted according to a time sequence.

Let the supermarket transaction records of Table 1 be taken for example. The event condition is a time interval from 2017/06/01 to 2017/06/30. That is, in the present example, the event condition is a time interval. The sequence creating unit 130 obtains from the original data each client's purchase data whose checkout time is within the time interval of 2017/06/01 to 2017/06/30 according to the client identification recorded in the client identification field and the event condition. The client purchase data are listed in Table 2. For example, the above purchase data within the time interval may be processed using the sequential pattern mining technology. Exemplarily but not restrictively, the purchase data may include the name, the quantity and the unit price of each commodity purchased by the clients.

TABLE 2

| Client Identification | Checkout Time (yyyy/mm/dd hh/mm) | Commodity | Quantity | Unit Price (dollar) |
|---|---|---|---|---|
| 17850 | 2017/6/5 18:26 | Tissue | 6 | 40 |
| 17850 | 2017/6/12 09:06 | Flour | 2 | 25 |
| 17850 | 2017/6/17 20:02 | Sunflower Oil | 6 | 120 |
| 17850 | 2017/6/28 15:41 | Towel | 12 | 10 |
| 13777 | 2017/6/3 16:26 | Tissue | 6 | 40 |
| 13777 | 2017/6/14 11:06 | Flour | 2 | 25 |
| 13777 | 2017/6/17 14:02 | Sunflower Oil | 6 | 120 |
| 13777 | 2017/6/30 10:41 | Towel | 12 | 10 |
| 16931 | 2017/6/13 17:26 | Flour | 2 | 25 |
| 16931 | 2017/6/14 11:36 | Tooth Brush | 5 | 20 |
| 16931 | 2017/6/27 15:32 | Cheese | 1 | 55 |
| 15862 | 2017/6/12 13:26 | Flour | 2 | 25 |
| 15862 | 2017/6/14 19:08 | Tooth Brush | 5 | 20 |
| 16552 | 2017/6/10 16:00 | Flour | 2 | 25 |
| 16552 | 2017/6/24 10:52 | Tooth Brush | 5 | 20 |
| 14729 | 2017/6/3 16:46 | Sunflower Oil | 6 | 120 |
| 14729 | 2017/6/17 14:25 | Towel | 12 | 10 |
| 14729 | 2017/6/27 15:17 | Milk | 3 | 90 |

The sequence creating unit 130 obtains at least one event fragment corresponding to each client according to each client's purchase data. For example, an event fragment may include a commodity and a purchase quantity. As for the purchase record of the client 17850, 6 units of tissue, 2 units of flour, 6 units of sunflower oil and 12 units of towel form an event fragment corresponding to the client 17850. In the example of the purchase record of Table 2, the event fragments corresponding to different clients may be obtained according to the commodity and the quantity of each commodity purchased by the clients, and the event fragment corresponding to each client may be listed in Table 3(a). That is, the content of each event fragment is {Commodity, Quantity}.

TABLE 3(a)

| Client Identification | Event Fragment | Event Fragment | Event Fragment | Event Fragment |
|---|---|---|---|---|
| 17850 | {Tissue, 6} | {Flour, 2} | {Sunflower Oil, 6} | {Towel, 12} |
| 13777 | {Tissue, 6} | {Flour, 2} | {Sunflower Oil, 6} | {Towel, 12} |
| 16931 | {Flour, 2} | {Tooth Brush, 5} | {Cheese, 1} | |
| 15862 | {Flour, 2} | {Tooth Brush, 5} | | |
| 16552 | {Flour, 2} | {Tooth Brush, 5} | | |
| 14729 | {Sunflower Oil, 6} | {Towel, 12} | {Milk, 3} | |

For convenience of description, the client identifications 17850, 13777, 16931, 15862, 16552 and 14729 are referred as the clients 1, 2, 3, 4, 5 and 6, respectively; event fragments {Tissue, 6}, {Flour, 2}, {Sunflower Oil, 6}, {Towel, 12}, {Tooth Brush, 5}, {Cheese, 1} and {Milk, 3} are referred as event fragments A, B, C, D, E, F and G, respectively. Thus, Table 3(a) is rearranged as Table 3(b).

TABLE 3(b)

| Clients | Event Fragment | Event Fragment | Event Fragment | Event Fragment |
|---|---|---|---|---|
| 1 | A | B | C | D |
| 2 | A | B | C | D |
| 3 | B | E | F | |
| 4 | B | E | | |
| 5 | B | E | | |
| 6 | C | D | G | |

In Table 3(b), the four-event fragments A, B, C, D corresponding to the client 1 form an event fragment sequence {A, B, C, D} corresponding to the client 1. Similarly, the four-event fragments corresponding to the client 2 form an event fragment sequence {A, B, C, D} corresponding to the client 2. The three-event fragments corresponding to the client 3 form an event fragment sequence {B, E, F} corresponding to the client 3. The two-event fragments corresponding to the client 4 form an event fragment sequence {B, E} corresponding to the client 4. The two-event fragments corresponding to the client 5 form an event fragment sequence {B, E} corresponding to the client 5. The three-event fragments corresponding to the client 6 form an event fragment sequence {C, D, G} corresponding to the client 6. Referring to Table 4(a), the event fragment sequences corresponding to the clients 1-6 are respectively listed. The event fragments of each event fragment sequence are sorted according to a time sequence.

TABLE 4(a)

| Clients | Event Fragment Sequence |
|---|---|
| 1 | A B C D |
| 2 | A B C D |
| 3 | B E F |
| 4 | B E |
| 5 | B E |
| 6 | C D G |

Then, the method proceeds to step S208 in which the sequence creating unit 130 obtains sequence data according to each identification data and the event fragment sequence corresponding to each identification, wherein the sequence data is listed in Table 4(a). In step S210, the de-identification unit 140 obtains a de-identification data by adjusting the sequence data.

Figure 3:
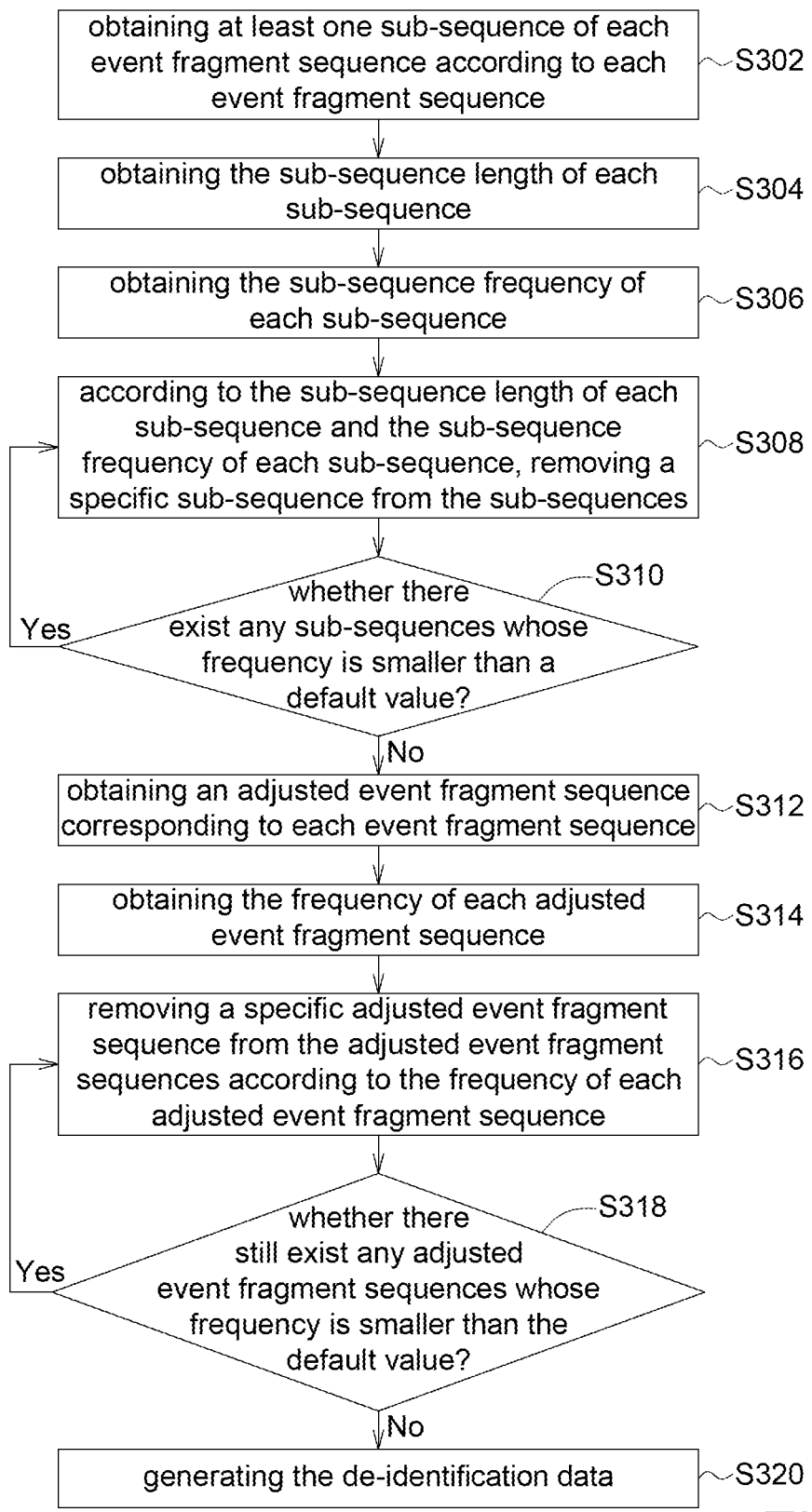
FIG. 3 is a flowchart of obtaining de-identification data by adjusting the sequence data according to an embodiment of the application.

Referring to FIG. 3, a flowchart of obtaining a de-identification data by adjusting the sequence data according to an embodiment of the application is shown. In step S210 of FIG. 2, the de-identification unit 140 obtains a de-identification data by adjusting the sequence data. Steps S302~S320 of FIG. 3 further describe the step S210 of the flowchart of FIG. 2 of obtaining the de-identification data by adjusting the sequence data. Anyone who is skilled in the technology field of the application will understand that the method of obtaining the de-identification data by adjusting the sequence data is not limited to the steps and sequence of the flowchart of FIG. 3.

In step S302, the de-identification unit 140 obtains at least one sub-sequence of each event fragment sequence according to each event fragment sequence. For example, each sub-sequence of each event fragment sequence may be obtained using the Apriori algorithm or the PrefixSpan algorithm. Let Table 4(a) be taken for example. Event fragment sequences of the clients 1 and 2 are both {A, B, C, D} whose sub-sequences include {A}, {B}, {C}, {D}, {A, B}, {A, C}, {A, D}, {B, C}, {B, D}, {C, D}, {A, B, C}, {A, B, D}, {A, C, D}, {B, C, D} and {A, B, C, D}. The event fragment sequence of the client 3 is {B, E, F} whose sub-sequences include {B}, {E}, {F}, {B, E}, {B, F}, {E, F}, {B, E, F}. Event fragment sequences of the clients 4 and 5 are both {B, E} whose sub-sequences include {B}, {E}, and {B, E}. The event fragment sequence of the client 6 is {C, D, G} whose sub-sequences include {C}, {D}, {G}, and {C, D}, {C, G}, {D, G}, and {C, D, G}.

In step S304, the de-identification unit 140 obtains the sub-sequence length of each sub-sequence, that is, the number of event fragments in a sub-sequence. Let Table 4(a) be taken for example. Each of the sub-sequences {A}, {B}, {C}, {D}, {E}, {F}, and {G} has a length of sub-sequence of 1. Each of the sub-sequences {A, B}, {A, C}, {A, D}, {B, C}, {B, D}, {C, D}, {B, E}, {B, F}, {E, F}, {C, G}, {D, G} has a length of sub-sequence of 2. Each of the sub-sequences {A, B, C}, {A, B, D}, {A, C, D}, {B, C, D}, {B, E, F}, {C, D, G} has a length of sub-sequence of 3. The sub-sequence {A, B, C, D} has a length of sub-sequence of 4.

In step S306, the de-identification unit 140 obtains the sub-sequence frequency of each sub-sequence. For example, the frequency of each sub-sequence may be calculated using the Apriori algorithm or the PrefixSpan algorithm. Let Table 4(a) be taken for example. The sub-sequence {A} has a frequency of 2. The sub-sequence {B} has a frequency of 5. The sub-sequence {C} has a frequency of 3. The sub-sequence {D} has a frequency of 3. The sub-sequence {E} has a frequency of 3. The sub-sequence {F} has a frequency of 1. The sub-sequence {G} has a frequency of 1. The sub-sequence {A, B} has a frequency of 2. The sub-sequence {A, C} has a frequency of 2. The sub-sequence {A, D} has a frequency of 2. The sub-sequence {B, C} has a frequency of 2. The sub-sequence {B, D} has a frequency of 2. The sub-sequence {C, D} has a frequency of 3. The sub-sequence {B, E} has a frequency of 3. The sub-sequence {B, F} has a frequency of 1. The sub-sequence {E, F} has a frequency of 1. The sub-sequence {C, G} has a frequency of 1. The sub-sequence {D, G} has a frequency of 1. The sub-sequence {A, B, C} has a frequency of 2. The sub-sequence {A, B, D} has a frequency of 2. The sub-sequence {A, C, D} has a frequency of 2. The sub-sequence {B, C, D} has a frequency of 2. The sub-sequence {B, E, F} has a frequency of 1. The sub-sequence {C, D, G} has a frequency of 1. The sub-sequence {A, B, C, D} has a frequency of 2.

In step S308, the de-identification unit 140 removes a specific sub-sequence according to its length and frequency. In an embodiment, the de-identification unit 140 selects from each sub-sequence a specific sub-sequence having the smallest length and frequency smaller than a default value, and then removes the selected specific sub-sequence from the sub-sequences. That is, the specific sub-sequence having frequency smaller than the default value is removed.

Let Table 4(a) be taken for example. The default value is exemplified by 2, which is also the k value in the k-anonymity parameter of the k-anonymity technology. The de-identification unit 140 selects the sub-sequences whose length is 1 and frequency is smaller than 2, that is, sub-sequences {F} and {G}, and then removes the selected sub-sequences {F} and {G} from the sub-sequences. That is, the sub-sequences {F} and {G} having frequency smaller than the k-anonymity parameter are removed.

After the specific sub-sequences whose length is the smallest and frequency is smaller than the default value are removed, the method proceeds to step S310 in which the de-identification unit 140 determines whether there exist any sub-sequences whose frequency is smaller than a default value. If yes in step 310, then the de-identification unit 140 again selects the specific sub-sequence whose length is the smallest and frequency is smaller than the default value, and then removes the selected specific sub-sequence from the remaining sub-sequences.

If no in step S310, that is, none of the sub-sequence has a frequency smaller than the default value, then the method proceeds to step S312 in which the de-identification unit 140 obtains an adjusted event fragment sequence corresponding to each event fragment sequence according to the remaining sub-sequences. Let the content of Table 4(a) be taken for example and the default value (the k-anonymity parameter) be exemplified by 2. After the specific sub-sequence is removed according to its length and frequency, the adjusted event fragment sequences are obtained as listed in Table 4(b). In comparison to Table 4(a), Table 4(b) removes sub-sequences {F} and {G}.

TABLE 4(b)

| Clients | Adjusted Event Fragment Sequence |
| --- | --- |
| 1 | A B C D |
| 2 | A B C D |
| 3 | B E |
| 4 | B E |
| 5 | B E |
| 6 | C D |

Afterwards, in step S314, the de-identification unit 140 obtains the frequency of each adjusted event fragment sequence. For example, the frequency of each adjusted event fragment sequence may be calculated using the Apriori algorithm or the PrefixSpan algorithm. In the example of Table 4(b), the adjusted event fragment sequence {A, B, C, D} has a frequency of 2; the adjusted event fragment sequence {B, E} has a frequency of 3; and the adjusted event fragment sequence {C, D} has a frequency of 1.

In step S316, the de-identification unit 140 removes a specific adjusted event fragment sequence according to the frequency of each adjusted event fragment sequence. In an embodiment, the de-identification unit 140 selects from the adjusted event fragment sequences the specific adjusted event fragment sequence whose frequency is smaller than the default value and then removes the selected specific adjusted event fragment sequence from the adjusted event fragment sequences. That is, the frequency of the specific adjusted event fragment sequence removed from the adjusted event fragment sequences is smaller than the default value.

Let Table 4(b) be taken for example. The default value "k", the k-anonymity parameter of the k-anonymity technology, is exemplified by 2. The de-identification unit 140 obtains the adjusted event fragment sequence {C, D} whose frequency is smaller than 2, and then removes the adjusted event fragment sequence {C, D} from the adjusted event fragment sequences. That is, the adjusted event fragment sequence {C, D} having frequency smaller than the k-anonymity parameter is removed.

After the specific adjusted event fragment sequence having frequency smaller than the default value is removed, in step S318, the de-identification unit 140 determines whether there still exist any adjusted event fragment sequences whose frequency is smaller than the default value. If yes, then the de-identification unit 140 again selects from the remaining adjusted event fragment sequences the specific adjusted event fragment sequence whose frequency is smaller than the default value and then removes the selected specific adjusted event fragment sequence from the remaining adjusted event fragment sequences.

If no in step S318, then the method proceeds to step S320 in which the de-identification unit 140 selects a remaining event fragment sequence from the remaining event fragment sequences and uses the selected event fragment sequence as the de-identification data. In the content of Table 4(b) be taken for example. The default value, being the k-anonymity parameter, is exemplified by 2. After the specific adjusted event fragment sequence is removed according to the frequency of event fragment sequence, the remaining event fragment sequences are obtained and selected as the de-identification data as listed in Table 4(c). The designation "*" represents the adjusted event fragment sequence corresponding to the client 6. This adjusted event fragment sequence is removed or shielded because its frequency is smaller than the default value.

TABLE 4(c)

| Client | Remaining Event Fragment Sequence |
|---|---|
| 1 | A B C D |
| 2 | A B C D |
| 3 | B E |
| 4 | B E |

TABLE 4(c)-continued

| Client | Remaining Event Fragment Sequence |
|---|---|
| 5 | B E |
| 6 | * * |

In the de-identification data of Table 4(c), the frequency of each remaining event fragment sequence is larger than the default value (the k-anonymity parameter) and matches the k-anonymity requirement of the k-anonymity technology, such that at least k-1 items of data cannot be differentiated with the selected data.

In another embodiment of the application, the scenario is exemplified by investors' investment in the stock market, and investment portfolio data are de-identified. For example, at least one event fragment corresponding to each investor is obtained according to each investor's investment data. For example, the event fragments corresponding to each investor are listed in Table 5(a). In the present embodiment, the category and quantity of each stock purchased by an investor form an event fragment corresponding to the investor. Let the stock purchase record of an investor 13378 be taken for example. The purchase records of 3 lots of stocks under the shipping category, 3 lots of stocks under the tourism category, 3 lots of stocks under the chemistry category and 3 lots of stocks under the optoelectronics category are the event fragments corresponding to the investor 13378. In the present embodiment, the event fragments corresponding to different investors are obtained according to the categories and quantities of the purchased stocks. That is, the content of each event fragment is {Stock Category, Quantity}.

TABLE 5(a)

| Investor ID | Event Fragment | Event Fragment | Event Fragment | Event Fragment |
|---|---|---|---|---|
| 13378 | {Shipping Category, 3} | {Tourism Category, 3} | {Chemistry Category, 3} | {Optoelectronics Category, 3} |
| 14359 | {Textile Category, 2} | {Tourism Category, 3} | | |
| 16215 | {Optoelectronics Category, 3} | {Shipping Category, 3} | {Textile Category, 2} | {Chemistry Category, 3} |
| 13842 | {Steel Category, 2} | {Textile Category, 2} | {Chemistry Category, 3} | {Semiconductor Category, 4} |
| 17518 | {Shipping Category, 3} | {Chemistry Category, 3} | {Semiconductor Category, 4} | {Optoelectronics Category, 3} |
| 11258 | {Textile Category, 2} | {Tourism Category, 3} | {Optoelectronics Category, 3} | |

For convenience of description, the investor identifications (IDs) 11378, 14359, 16215, 13842, 17815 and 11258 are referred as the investors 1, 2, 3, 4, 5 and 6, respectively; event fragments {Shipping Category, 3}, {Tourism Category, 3}, {Chemistry Category, 3}, {Optoelectronics Category, 3}, {Textile Category, 2}, {Steel Category, 2} and {Semiconductor Category, 4} respectively are referred as A, B, C, D, E, F and G, respectively. Thus, Table 5(a) may be rearranged as Table 5(b).

TABLE 5(b)

| Investor | Event Fragment | Event Fragment | Event Fragment | Event Fragment |
|---|---|---|---|---|
| 1 | A | B | C | D |
| 2 | E | B | | |
| 3 | D | A | E | C |
| 4 | F | E | C | G |

TABLE 5(b)-continued

| Investor | Event Fragment | Event Fragment | Event Fragment | Event Fragment |
|---|---|---|---|---|
| 5 | A | C | G | D |
| 6 | E | B | D | |

In Table 5(b), the four-event fragments A, B, C, D corresponding to the investor 1 form an event fragment sequence {A, B, C, D} corresponding to the investor 1. Similarly, the four-event fragments corresponding to the investor 2 form an event fragment sequence {B, E} corresponding to the investor 2. The three-event fragments corresponding to the investor 3 form an event fragment sequence {A, C, D, E} corresponding to the investor 3. The two-event fragments corresponding to the investor 4 form an event fragment sequence {C, E, F, G} corresponding to the investor 4. The two-event fragments corresponding to the investor 5 form an event fragment sequence {A, C, D, G} corresponding to the investor 5. The three-event fragments corresponding to the investor 6 form an event fragment sequence {B, D, E} corresponding to the investor 6. Referring to Table 5(c), the event fragment sequences corresponding to the investors 1-6 are respectively listed. In the present embodiment, the event fragments of each event fragment sequence are not necessarily sorted according to a time sequence. That is, the present embodiment performs de-identification to non-time-series data.

TABLE 5(c)

| Investor | Event Fragment Sequence |
|---|---|
| 1 | A B C D |
| 2 | B E |
| 3 | A C D E |
| 4 | C E F G |
| 5 | A C D G |
| 6 | B D E |

Then, sequence data as listed in Table 5(c) is obtained according to the identification data (investor identification) and the event fragment sequence corresponding to the identification data. Afterwards, the de-identification data is obtained by adjusting the sequence data.

To adjust the sequence data to obtain the de-identification data, at least one sub-sequence of each event fragment sequence may be first obtained according to each event fragment sequence. For example, in an event fragment sequence, each sub-sequence and its length (the number of event fragments in a sub-sequence) and frequency may be obtained using the Apriori algorithm or the PrefixSpan algorithm. For example, the frequency of each sub-sequence may be calculated using the Apriori algorithm or the PrefixSpan algorithm.

A specific sub-sequence is removed according to its length and frequency. In an embodiment, the specific sub-sequence whose length is the smallest and frequency is smaller than a default value is selected and removed from the sub-sequences. After the specific sub-sequence whose length is the smallest and frequency is smaller than the default value is removed, whether there are any sub-sequences having frequency smaller than the default value is determined. If yes, then the specific sub-sequence whose length is the smallest and frequency is smaller than the default value is again selected and removed from the remaining sub-sequences. If it is determined that none of the sub-sequences has a frequency smaller than the default value, an adjusted event fragment sequence corresponding to each event fragment sequence is obtained according to the remaining sub-sequences.

In the content of Table 5(c) be taken for example. The default value, being the k-anonymity parameter, is exemplified by 2. After the specific sub-sequence is removed according to its length and frequency, the adjusted event fragment sequences may be obtained as listed in Table 5(d). In comparison to Table 5(c), Table 5(d) removes sub-sequences {F} and {G}.

TABLE 5(d)

| Investor | Adjusted Event Fragment Sequence |
|---|---|
| 1 | A C D |
| 2 | B E |
| 3 | A C D |
| 4 | C E |
| 5 | A C D |
| 6 | B E |

Then, the frequency of each adjusted event fragment sequence is obtained. For example, the frequency of each adjusted event fragment sequence may be calculated using the Apriori algorithm or the PrefixSpan algorithm. Let the content of Table 5(d) be taken for example. The adjusted event fragment sequence {A, C, D} has a frequency of 3. The adjusted event fragment sequence {B, E} has a frequency of 2. The adjusted event fragment sequence {C, E} has a frequency of 1.

A specific adjusted event fragment sequence is removed according to its frequency. In an embodiment, the specific adjusted event fragment sequence whose frequency is smaller than the default value is selected and removed from the adjusted event fragment sequences. Let Table 5(d) be taken for example. The default value, being the k-anonymity parameter of the k-anonymity technology, is exemplified 2. An adjusted event fragment sequence {C, E} has a frequency smaller than 2, and the adjusted event fragment sequence {C, E} is removed from the adjusted event fragment sequences.

After the specific adjusted event fragment sequence whose frequency is smaller than the default value is removed, whether there are any adjusted event fragment sequences whose frequency is smaller than the default value is determined. If there are other adjusted event fragment sequences whose frequency is smaller than the default value remaining in the adjusted event fragment sequences, then the specific adjusted event fragment sequence whose frequency is smaller than the default value is again selected and removed from the remaining adjusted event fragment sequence.

If it is determined that none of the adjusted event fragment sequences has a frequency smaller than the default value, then a remaining event fragment sequence among the adjusted event fragment sequences is selected as the de-identification data according to the remaining adjusted event fragment sequences. Let the content of Table 5(d) be taken for example. The default value (the k-anonymity parameter) is exemplified by 2. After the specific adjusted event fragment sequence is removed according to its frequency, the remaining event fragment sequences listed in Table 5(e) may be selected as the de-identification data. The designation "*" represents the adjusted event fragment sequence corresponding to the client 4. This adjusted event fragment sequence is removed or shielded because its frequency is smaller than the default value.

TABLE 5(e)

| Investor | Remaining Event Fragment Sequence |
| --- | --- |
| 1 | A C D |
| 2 | B E |
| 3 | A C D |
| 4 | * * |
| 5 | A C D |
| 6 | B E |

In the de-identification data of Table 5(e), the frequency of each remaining event fragment sequence is larger than the default value (the k-anonymity parameter) and matches the k-anonymity requirement of the k-anonymity technology, such that at least k-1 items of data cannot be differentiated with the selected data.

In the embodiments of the application, the event fragments (such as names and quantities of the purchased commodities) and the event fragment sequences corresponding to different identification data are obtained according to the identification data of the original data and the specified event condition (such as a time interval). The event fragment sequence corresponding to different identification data are adjusted according to the frequency of each sub-sequence of the event fragment sequence and the frequency of the event fragment sequence, and the de-identification data is obtained according to the remaining event fragment sequence to complete the anonymization process.

Thus, in processing original data released by the government and business and in processing Internet trading data and Internet of Things (IoT) data, the time-series data may be de-identified using the data de-identification method in an embodiment of the application. The non-structural time-series data may be divided into multiple time intervals or time fragments. The time interval or time fragment may be used as an event condition and each time fragment may be processed using the sequential pattern mining technology. Accordingly, within each time fragment, the frequency of each event fragment sequence and the frequency of each sub-sequence are not smaller than the k-anonymity parameter to ensure data protection. By changing the start time and the end time of the time fragment on the time axis, different time fragments and different time-series data may be obtained, such that original data may still have high completeness and data loss rate may be low. Moreover, the data de-identification method of an embodiment of the application does not change or conceptualize original data as new data, such that the difference between the de-identified data and the original data may be small and data may have high completeness.

While the application has been described by way of example and in terms of the preferred embodiment(s), it is to be understood that the application is not limited thereto. On the contrary, it is intended to cover various modification and similar arrangements and procedures, and the scope of the appended claims therefore should be accorded the broadest interpretation so as to encompass all such modification and similar arrangements and procedures.

What is claimed is:

1. A data de-identification method, comprising:
    obtaining original data comprising an identification field, a condition field and a record field;
    obtaining an event condition according to the condition field;
    obtaining from the original data a plurality of event fragment sequences corresponding to each of a plurality of identification data and corresponding to the event condition according to the plurality of identification data in the identification field and the event condition;
    obtaining sequence data according to the plurality of identification data and the plurality of event fragment sequences corresponding to each of the identification data; and
    obtaining de-identification data by adjusting the sequence data according to a sub-sequence length and a sub-sequence frequency of each of at least one sub-sequence obtained from each of the event fragment sequences.

2. The data de-identification method according to claim 1, wherein the step of obtaining the plurality of event fragment sequences corresponding to each of the identification data and corresponding to the event condition comprises:
    obtaining each of a plurality of record data corresponding to each of the identification data and corresponding to the event condition from the plurality of record data recorded in the record field;
    obtaining at least one event fragment corresponding to each of the identification data according to each of the record data corresponding to each of the identification data; and
    obtaining the plurality of event fragment sequences corresponding to each of the identification data according to the at least one event fragment corresponding to each of the identification data.

3. The data de-identification method according to claim 2, wherein the at least one event fragment of each of the plurality of event fragment sequences is sorted according to a time sequence.

4. The data de-identification method according to claim 1, wherein the step of obtaining the de-identification data by adjusting the sequence data includes:
    obtaining the at least one sub-sequence of each of the event fragment sequences according to each of the event fragment sequences;
    removing a specific sub-sequence from the at least one sub-sequence according to the sub-sequence length of each of the at least one sub-sequence and the sub-sequence frequency of each of the at least one sub-sequence in the sequence data; and
    obtaining a plurality of adjusted event fragment sequences corresponding to each of the event fragment sequences.

5. The data de-identification method according to claim 4, wherein the sub-sequence frequency of the specific sub-sequence is smaller than a k-anonymity parameter.

6. The data de-identification method according to claim 4, the step of obtaining the de-identification data by adjusting the sequence data includes:
    obtaining the de-identification data by removing a specific adjusted event fragment sequence from the adjusted event fragment sequences of each of the event fragment sequences according to an event fragment sequence frequency of each of the adjusted event fragment sequences.

7. The data de-identification method according to claim 6, wherein the event fragment sequence frequency of the specific adjusted event fragment sequence is smaller than a k-anonymity parameter.

8. The data de-identification method according to claim 1, wherein the condition field is a time field in which a plurality of time data are recorded.

9. A data de-identification apparatus, comprising:
    a processor; and
    a memory coupled to the processor, wherein the processor is configured for:

obtaining original data comprising an identification field, a condition field and a record field;

obtaining an event condition according to the condition field; obtaining from the original data a plurality of event fragment sequences corresponding to each of a plurality of identification data and corresponding to the event condition according to the plurality of identification data in the identification field and the event condition;

obtaining sequence data according to the plurality of identification data and the plurality of event fragment sequences corresponding to each of the identification data; and obtaining de-identification data by adjusting the sequence data according to a sub-sequence length and a sub-sequence frequency of each of at least one sub-sequence obtained from each of the event fragment sequences.

10. The data de-identification apparatus according to claim 9, wherein the processor is configured for:

obtaining each of a plurality of record data corresponding to each of the identification data and corresponding to the event condition from the plurality of record data recorded in the record field;

obtaining at least one event fragment corresponding to each of the identification data according to each of the record data corresponding to each of the identification data; and obtaining the plurality of event fragment sequences corresponding to each of the identification data according to the at least one event fragment corresponding to each of the identification data.

11. The data de-identification apparatus according to claim 10, wherein the at least one event fragment of each of the plurality of event fragment sequences is sorted according to a time sequence.

12. The data de-identification apparatus according to claim 9, wherein the processor is configured for:

obtaining at least one sub-sequence of each of the event fragment sequences according to each of the event fragment sequences;

removing a specific sub-sequence from the at least one sub-sequence according to the sub-sequence length of each of the at least one sub-sequence and the sub-sequence frequency of each of the at least one sub-sequence in the sequence data; and obtaining a plurality of adjusted event fragment sequences corresponding to each of the event fragment sequences.

13. The data de-identification apparatus according to claim 12, wherein the sub-sequence frequency of the specific sub-sequence is smaller than a k-anonymity parameter.

14. The data de-identification apparatus according to claim 12, wherein the processor is configured for:

obtaining the de-identification data by removing a specific adjusted event fragment sequence from the adjusted event fragment sequences of each of the event fragment sequences according to an event fragment sequence frequency of each of the adjusted event fragment sequences.

15. The data de-identification apparatus according to claim 14, wherein the event fragment sequence frequency of the specific adjusted event fragment sequence is smaller than a k-anonymity parameter.

16. The data de-identification apparatus according to claim 9, wherein the condition field is a time field in which a plurality of time data are recorded.

17. A non-transitory computer readable storage medium storing one or more than one software program comprising a plurality of instructions, wherein when the plurality of instructions are executed by one or more than one processor of an electronic apparatus, the electronic apparatus performs a data de-identification method comprising:

obtaining original data comprising an identification field, a condition field and a record field;

obtaining an event condition according to the condition field;

obtaining from the original data a plurality of event fragment sequences corresponding to each of a plurality of identification data and corresponding to the event condition according to the plurality of identification data in the identification field and the event condition;

obtaining sequence data according to the plurality of identification data and the plurality of event fragment sequences corresponding to each of the identification data; and obtaining de-identification data by adjusting the sequence data according to a sub-sequence length and a sub-sequence frequency of each of at least one sub-sequence obtained from each of the event fragment sequences.

* * * * *